Figure 2:
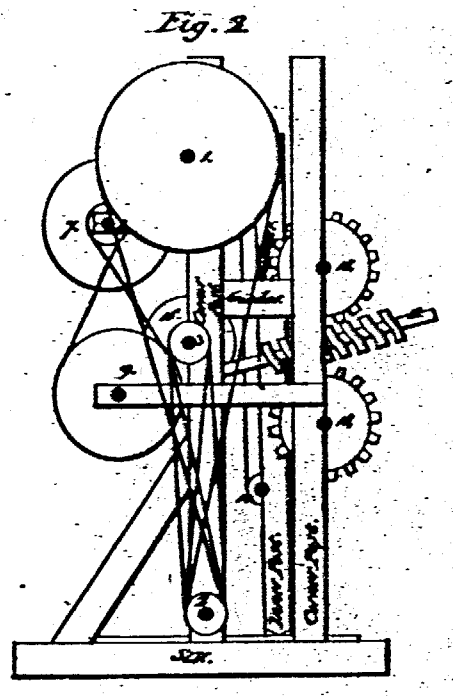

X0009314

Sheet 1. 2 Sheets.

S. Marsh.
Cloth Napping Mach.

Patented Jan. 11, 1836.

U. S. PATENT OFFICE, PHOTO-LITHOGRAPHED, WASHINGTON, D. C.

X 0009314
Sheet 2. 2 Sheets
S. Marsh.
Cloth Napping Mach.
Patented Jan. 11, 1836.
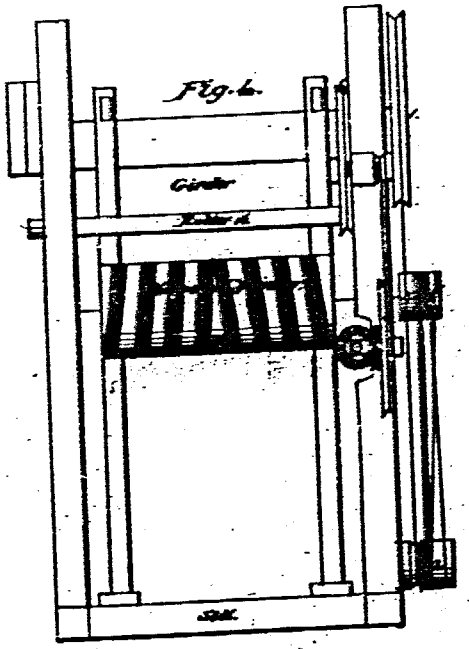
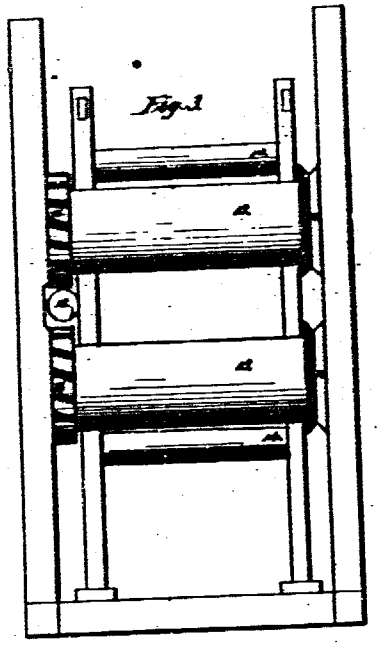
E. PETERS, PHOTO-LITHOGRAPHER, WASHINGTON, D. C.

9314X Jan 11. 1836 1.

Stephen Marsh of Jerico Vermont
Letters Patent (Patented January 11. 1836.)
The Schedule referred to in these Letters Patent and making part of
the same containing a description in the words of the said Ste
phen Marsh himself of his improvement in the complete
Napper for Napping cloth.

To all persons to whom these presents shall come, Greeting..
Be it Known that I Stephen Marsh of Jerico in the County
of Chittenden and State of Vermont have Invented, construct
ed made and applied to use a new and useful improvement
in the mode and manner of Napping and dressing cloth
by one continued opperation until the napping and dressing
is completed which is Known and denominated the complete Nap
per: Which said improvement is described and Specified in the
words and figures following, to wit: Figures one and two rep
resent the two ends with all the frame work and machinery
seen in those directions. And figures three and four repre
sent the two sides of the frame and machinery as seen in those
directions. The drawing is about one twelfth part of the com..
size which is found to be suitable in practice, but may be varied
in size to suit the operator. Figure 3. exhibits the cloth cyl
inders 13. The pullies 10. on one end are to receive friction
bands to produce suitable tension on the cloth. The spur wheels
at the other end of the cloth cylinders are to gear into a spiral
cylinder or screw, a section of which is seen at 12. [illegible] 14 are
the adjusting cylinders and are connected by their pivots
with the inner posts — Figure 4. Exhibits the napping cylinder
15. the Roller 16. The Pulley called the driving Pulley No 1. on
the other end of the same shaft this is connected by a band
with and carries pulley No 2. This Pulley is a long one ...
carries the bands running from thence to pullies 3 & 4 & 5.

12.

The pulley 3. is fast on the shaft of the napping cylinder 15. and the pullies 4 & 5 are loose. When the napping cylinder is required to go one way the open band is placed on pulley 3. and when it is required to go the other way the open band is slipped on to a loose pulley, and the cross band slipped on to pulley 3. On the same shaft of pulley of 1. is a small pulley 6. partly seen above pulley 7. to which it is connected by a band and on the same shaft, with pulley 7. is a small pulley 8. which is connected by a band with pulley 9. and on the inside of pulley 9 and concentric therewith is a bevel wheel attached to the said pulley. and turning therewith on an axis of rotation. The other bevel wheel connected with the above is on the shaft of the screw or spiral cylinder 12 in the end of which is a small gudgeon or pivot which passes through the said axis of rotation and thereby keeps both wheels in due proximity.

Figure 1:
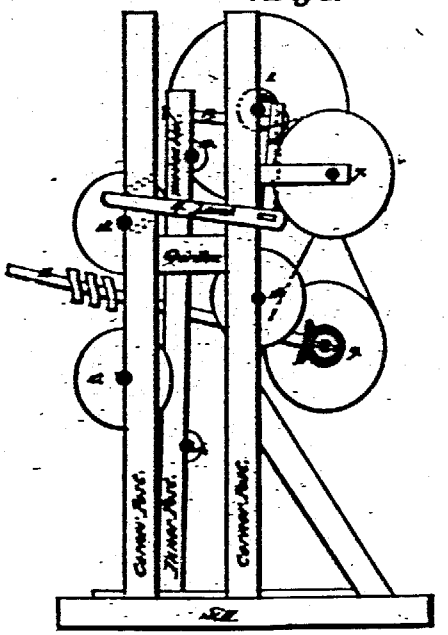

Figure 1 exhibits an end view of the frame to which the machinery is attached and a side view of pullies No 1. 7. 9 & 20. and an end view of the two cloth cylinders No 13. Also the adjusting cylinders 14. attached by their pivots to the inner posts, and the napping cylinder 15. also the Lever 17 which is attached to the end of the Roller 16. There is tenoned into the roller 2 uprights No 18 connected by swivle joints with the inner posts by long tenons or sword pieces. The cloth being stretched over the adjusting cylinders will show the cloth line, as marked from 14 to 14. Then by raising the lever 17 will bring the cloth in contact with the napping cylinder 15. and by lowering the said lever will make the cloth recede from the said cylinder. For the purpose of holding the lever in its proper place a number of holes are bored in the post, into which an adjusting pin may be put and moved as occasion may require. Or an adjusting cord or strap answer the same purpose. On pulley 9 is seen the bevel gear above described attached to the screw or spiral cylinder as aforesaid. Figure 2 exhibits the opposite end of the frame from figure 1. and also a side view of pullies No 1. 2. 3. 7. 8. and 9. and also a view of the spur wheels 10. on ends of the cloth cylinders, and the screw or spiral cylinder 12 passing between them and to be geared into either as occasion may require. Also an [illegible]

view of the napping cylinder 16. and one of the adjusting cylinder 14. The dark
parts of the napping cylinder are those on which the cards, or other napping ma-
terial is fixed. The edges of the cards should be let into the cylinder nearly one
eighth of an inch; so as to leave the card convex in the middle. The teeth of
the card should radiate nearly in right lines from the centre of the cylinder
or have but a small inclination or slope. To put this machine in operation
first wind the cloth on the lower cloth cylinder, which may be done by a crank
temporarily attached to the end of the gudgeon. Then bring the other end
of the cloth around the adjusting cylinders and attach it to the upper cloth
cylinder. Then gear the screw into the upper spur wheel; until the cloth has
run on that cylinder. and so alternately until the nap is finished.
The back of the cards, or that way which will take the least hold of the cloth
should be first used until the cloth is well begun, and then by changing
from the open to the cross band, run the napping cylinder the other way.
This will keep the teeth of the cards always in order, and the cloth will
not be injured. The said Stephen Marsh is aware that pullies
bands, spur wheels, bevel wheels, plain napping, and spiral cylinders have been
in use in various combinations. and hereby fully disclaims all right or title
to the invention of any part of the complete napper except what he verily be-
lieves is of his own invention, either in construction combination or arrangement.
The said Stephen Marsh is not however aware that such a com-
bination and arrangement of the different parts has heretofore been produced.
nor is he aware that the teeth of the cards have been set at any other than
the usual angle which from examinations appears to be about 48°. nor is
he aware that the pivot of one bevel or other wheel, has in any case been made
to pass through the axis of rotation of its accompanying or connecting wheel
He the said Stephen Marsh therefore claims as his invention the
direction of the card teeth, radiating in direct lines from the centre or axis
of the cylinder or having a less inclination than those which are now or
heretofore have been in use. Also the passing of the pivot of one wheel through the
axis of rotation of the other and the general arrangement and combination of the
machinery as herein before set forth. In testimony that the foregoing is a

9314 X 1-11-1836 4.

314.

this specification of my said improvement and Invention as herein before described. Whereunto set my hand this 12th day of November AD 1835

Witnesses
E. R. Johnson
John Johnson

Stephen Marsh (1838 now)

(Patented January 11. 1836.)
(Reissued anew September 12. 1838)

(Drawing)